(12) United States Patent
Loccisano

(10) Patent No.: US 12,247,549 B2
(45) Date of Patent: Mar. 11, 2025

(54) OPTIMIZATION SENSORS FOR A MIXER EJECTOR TURBINE

(71) Applicant: Vincent Loccisano, Wellesley, MA (US)

(72) Inventor: Vincent Loccisano, Wellesley, MA (US)

(\*) Notice: Subject to any disclaimer, the term of this patent is extended or adjusted under 35 U.S.C. 154(b) by 0 days.

(21) Appl. No.: 18/586,434

(22) Filed: Feb. 24, 2024

(65) Prior Publication Data

US 2024/0287965 A1 Aug. 29, 2024

Related U.S. Application Data

(60) Provisional application No. 63/486,882, filed on Feb. 24, 2023.

(51) Int. Cl.
*F03D 7/02* (2006.01)
*F03D 9/25* (2016.01)
*F03D 17/00* (2016.01)

(52) U.S. Cl.
CPC ............ *F03D 7/0204* (2013.01); *F03D 9/25* (2016.05); *F03D 17/009* (2023.08); *F05B 2220/706* (2013.01)

(58) Field of Classification Search
CPC ......... F03D 7/0204; F03D 9/25; F03D 17/009
See application file for complete search history.

(56) References Cited

U.S. PATENT DOCUMENTS

| | | | | |
|---|---|---|---|---|
| 4,353,681 A * | 10/1982 | Doman | ................. | F03D 7/0204 416/11 |
| 2011/0210549 A1* | 9/2011 | Haag | ..................... | F03D 7/0204 290/44 |
| 2013/0195655 A1* | 8/2013 | Kerner | .................... | F03B 3/123 416/212 A |
| 2013/0272877 A1* | 10/2013 | Andersen | ................. | G01P 5/14 416/42 |

\* cited by examiner

*Primary Examiner* — Sean Gugger

(57) ABSTRACT

A fluid-turbine system, method and apparatus optimizes wind-turbine performance by use of sensors embedded on a shroud and/or ejector shroud. The sensors monitor visible or audible movement, vibration, acoustic waves or temperature. A combination of sensors and monitoring means comprises a method for preventing or mitigating the negative effects of dormant failure.

2 Claims, 10 Drawing Sheets

OPTIMIZATION SENSORS FOR A MIXER EJECTOR TURBINE

BACKGROUND

Utility-scale wind turbines used for power generation generally have rotors with one to five open blades. Rotors transform wind energy into rotational torque that drives at least one generator. A generator is rotationally coupled to the rotor directly or through a transmission that converts mechanical energy to electrical energy. The transmission does this by converting the low rotational speed of the turbine rotor to a rotational speed appropriate for electrical generation.

Shrouded turbines surround a rotor that engages conditional-based monitoring equipment to monitor motion, vibration orientation or other characteristics of the turbine components to optimize performance.

Shrouded turbines comprise at least one ringed airfoil surrounding a rotor. A ringed airfoil provides aerodynamic benefits as well as a structural surface for conditional-based monitoring equipment. This type of equipment may use sensors to measure motion, vibration, orientation, or other characteristics of the turbine components to optimize performance.

Sensors for detecting motion include acoustic sensors based on electromagnetic effect, inductive coupling, capacitive coupling, triboelectric effect, piezoelectric effect and fiber-optic transmission. Optical, infrared sensors and video image processors sense opacity and compare results to previous images, and are often used in combination with algorithms to detect motion. Magnetic sensors and magnetometers use comparative geomagnetism to sense compass orientation and motion. Infrared-laser radar, ultrasonic- and microwave-radar sensors detect motion by reflecting transmitted energy. Inductive-loop sensors detect motion by electromagnetic induction and triboelectric effect. Seismic or inertia-switch sensors are used to detect vibration.

A pitot probe is a pressure-measurement instrument that measures fluid-flow velocity. Rather than average velocity of an overall stream, it measures local velocity at a given point in the flow stream.

A strain gauge measures an object's strain by use of an insulating flexible backing which supports a metallic foil pattern that is attached with adhesive to the object to be measured. As the foil surrounding the form deforms, its electrical resistance changes. Comparative measurements determine the strain or deformation of the object.

A passive yaw system uses aerodynamic structures to enable wind force to yaw a turbine into the wind. Larger turbines employ mechanical-yaw systems which are engaged with a support structure on a pivot axis near the center of gravity and the center of pressure. The location of the pivot axis relative to the center of pressure results in thrust forces on the apparatus that do not appropriately yaw the turbine to the desired direction, requiring continuous control from an active-yaw component.

Dormant failure is defined here as a failure of a device's functioning capabilities when the device is connected to a system in a normal operational configuration. Below-normal mechanical, electrical and environmental stresses for periodic or prolonged periods is considered dormant failure.

Because they have more exposed surface area, mechanical components are more susceptible to dormant failure than are electronic components.

Dormant failure can be mitigated by monitoring dormant components and conducting periodic test cycles for defined dormancy durations. If a component fails to move during a test cycle, it is repaired or reset; if necessary, the system may be shut down.

SUMMARY

A fluid-turbine system, method and apparatus optimizes wind-turbine performance by use of sensors embedded on a shroud and/or ejector shroud. The sensors monitor visible or audible movement, vibration, acoustic waves or temperature. A combination of sensors and monitoring means comprises a method for preventing or mitigating the negative effects of dormant failure.

In an example embodiment, a fluid turbine with a ringed-turbine shroud surrounds a rotor, and an ejector shroud surrounds the exit of the turbine shroud. In one embodiment, the turbine shroud may comprise a set of flaps along the trailing edge. Other embodiments include a turbine shroud with flaps that are in fluid communication with the inlet of an ejector shroud. Together, the turbine shroud and the ejector shroud form a pump that increases mass unit flow near the inlet of the turbine shroud, at the cross sectional area of the rotor plane. The pump further provides a means of energizing the wake behind the rotor plane. In combination, the effect of shrouds and the energized wake provide a rapidly mixed, short wake as compared with non-shrouded horizontal-axis wind turbines.

When a turbine is oriented such that the central axis of the rotor is aligned with the direction of the fluid stream, the turbine or the fluid stream may be referred to as on-axis. Conversely, when the turbine is oriented such that the central axis of the rotor is not aligned with the direction of the fluid stream, the turbine or the fluid stream may be referred to as off-axis.

A shrouded turbine pivots on an axis that is offset from the center of pressure to enable the turbine to move to a position in which the center of pressure remains downstream of the pivot axis. This provides passive yaw when the fluid stream is of sufficient strength, typically from cut-in fluid velocity to cut-out fluid velocity. Although the effects of passive yaw are present in any fluid velocity, a braking system prevents the function of the passive-yaw system before cut-in fluid velocity and after cut-out fluid velocity.

An active-yaw (or "motor-driven") yaw system rotates the nacelle of a fluid turbine into the direction of the fluid stream. It is normally disposed between a tower top and nacelle, where the components of the yaw system may be situated in the nacelle as well as in the tower. The yaw system has at least one adjustment drive which may be equipped with a gearbox, and a yaw bearing engaged with a ring gear. Once the nacelle's yaw adjustment completes, the nacelle is immobilized by brake units.

A combination active- and passive-yaw system benefits from an external measurement means for determining on-axis turbine direction. Pitot probes and acoustic sensors, combined with comparative measurement methods, provide such a means.

The shroud surfaces of a shrouded turbine experience varying static pressure when the turbine is yawed off-axis. In an example embodiment, pitot probes, positioned at various locations on the surface of the turbine shroud or the surface of the ejector shroud, combined with a comparative measurement means, provide a method for determining the orientation of the turbine axis with respect to wind direction. One method for aligning the turbine-rotor axis in the direction of the fluid-stream flow involves yawing the turbine until pitot probes on either side of the turbine show equal quantitative values. Equivalent static pressure on either side of a turbine denotes on-axis fluid-stream flow.

On-axis shrouded fluid turbines exhibit different acoustic vibrations than off-axis turbines. When oriented off axis, the shrouds and rotor experience asymmetrical loading; when on axis, they show symmetrical loading. The acoustic properties of asymmetrical loading are significantly different than the acoustic properties of symmetrical loading. Acoustic sensors placed on two points of a shroud serve to determine off-axis or on-axis turbine orientation.

Strain gauges located at the yaw pivot point and at moment-arm force-concentration areas on the tower enable measurement of fluid velocity vs. loading. This determines whether movable fluid-dynamic surface components have performed as intended. In an example embodiment, information from strain gauges at moment-arm force-concentration areas, combined with information from strain gauges at the yaw pivot-point, plus information about the on-axis or off-axis condition of the turbine, enable measurement of velocity vs. loading vs. direction of loading. This determines which aerodynamic-surface component has failed.

Dormant failure is mitigated or prevented in an example embodiment in which a motion sensor is housed in a sealed enclosure that surrounds a movable element on an active surface. As the active surface moves, the motion senor detects the movable element's motion. Active components are tested periodically to mitigate dormant failure.

In another example embodiment, motion sensors on passive-motion surfaces serve to mitigate dormant failure. A passive surface is made of a material that deforms in excessive fluid-stream flows to reduce the fluid-stream flow through the rotor plane. Part of the deformable surface is of a material that deforms under less-than-excessive fluid-stream flow velocity, and provides partial movement during normal operating conditions. This partial motion is not significant enough to alter the fluid-stream flow through the rotor plane and hence not sufficient to adversely affect the performance of the turbine. Motion sensors may be engaged with passive-motion surfaces to detect partial motion of these surfaces. Visual sensors may be engaged with stationary sections of the shrouds and directed at the passive motion surfaces to detect partial motion of the passive-motion surfaces.

The aerodynamic principles of a shrouded turbine are not restricted to air and apply to any fluid, whether liquid, gas or combination thereof. and therefore including water as well as air. The present embodiment is described in the context of a shrouded turbine and is not intended to be limiting in scope.

DETAILED DESCRIPTION

A shrouded turbine provides an improved means of generating power from fluid currents. The shrouded turbine has tandem cambered shrouds, with the primary shroud containing a rotor that extracts power from a primary fluid stream. Together, the tandem cambered shrouds and ejector bring increased flow through the rotor, with higher flow rates enabling increased energy extraction. The ejector shroud transfers energy from the bypass flow to the rotor-wake flow, enabling higher energy per unit mass flow rate through the rotor. These two effects enhance the overall power production of the turbine system.

The term "rotor" refers to any assembly with one or more blades attached to a shaft and able to rotate, enabling energy-extraction from wind rotating the blades. Any type of rotor may be enclosed with this disclosure, including propeller-like rotors and rotor/stator assemblies.

The leading edge of a turbine shroud may be considered the front of the fluid turbine, and the trailing edge of an ejector shroud may be considered the rear of the fluid turbine. A first component of the fluid turbine located closer to the front of the turbine may be considered "upstream" of a second, "downstream" component that is proximal to the rear of the turbine.

An embodiment of this disclosure is a fluid turbine with a shroud that surrounds a rotor, and an ejector shroud that surrounds the turbine shroud's exit. Sensors are placed on a shroud surface for the purpose of optimizing turbine performance.

Figure 1:
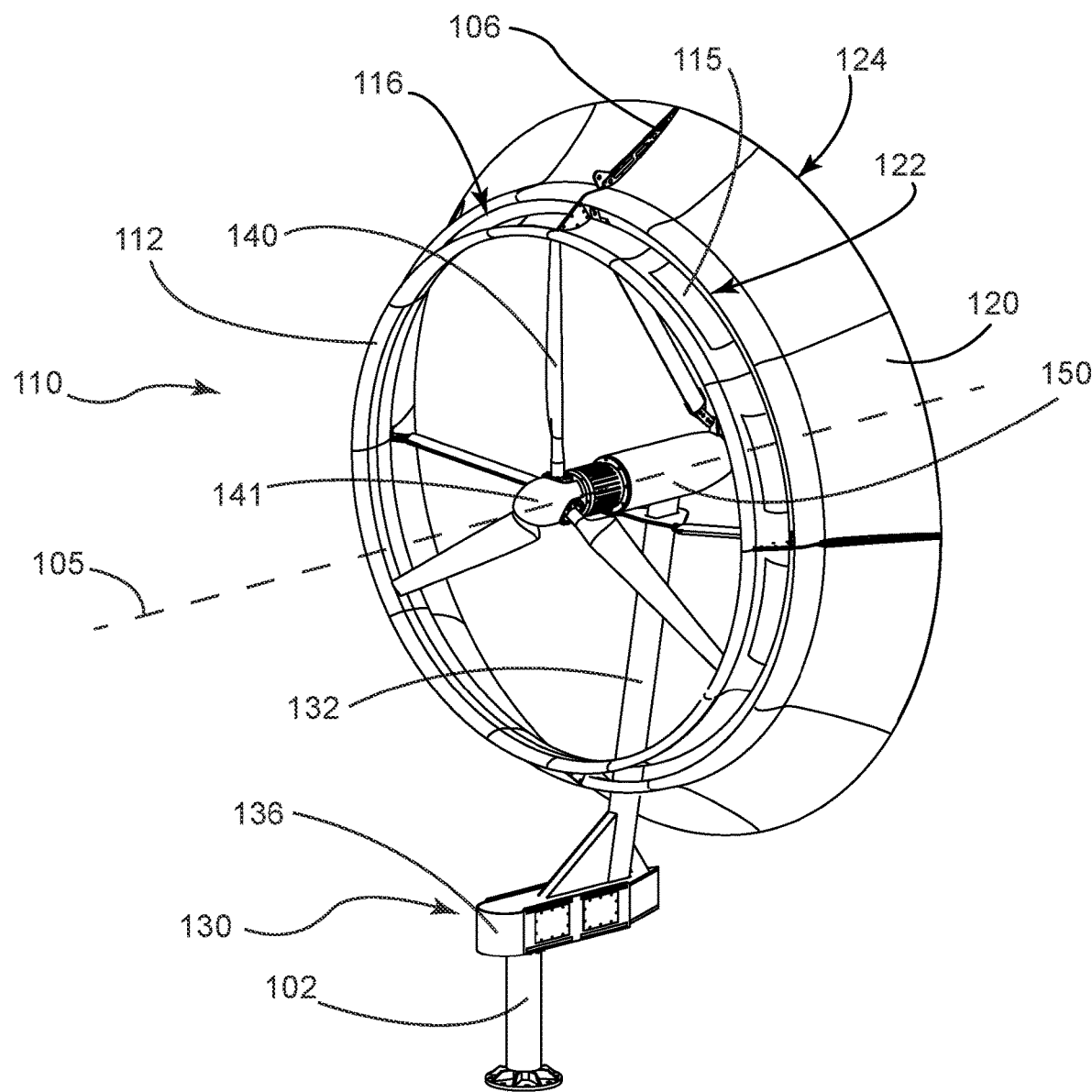
FIG. 1 is a front, right, perspective view of an example embodiment of the present disclosure.
Figure 3:
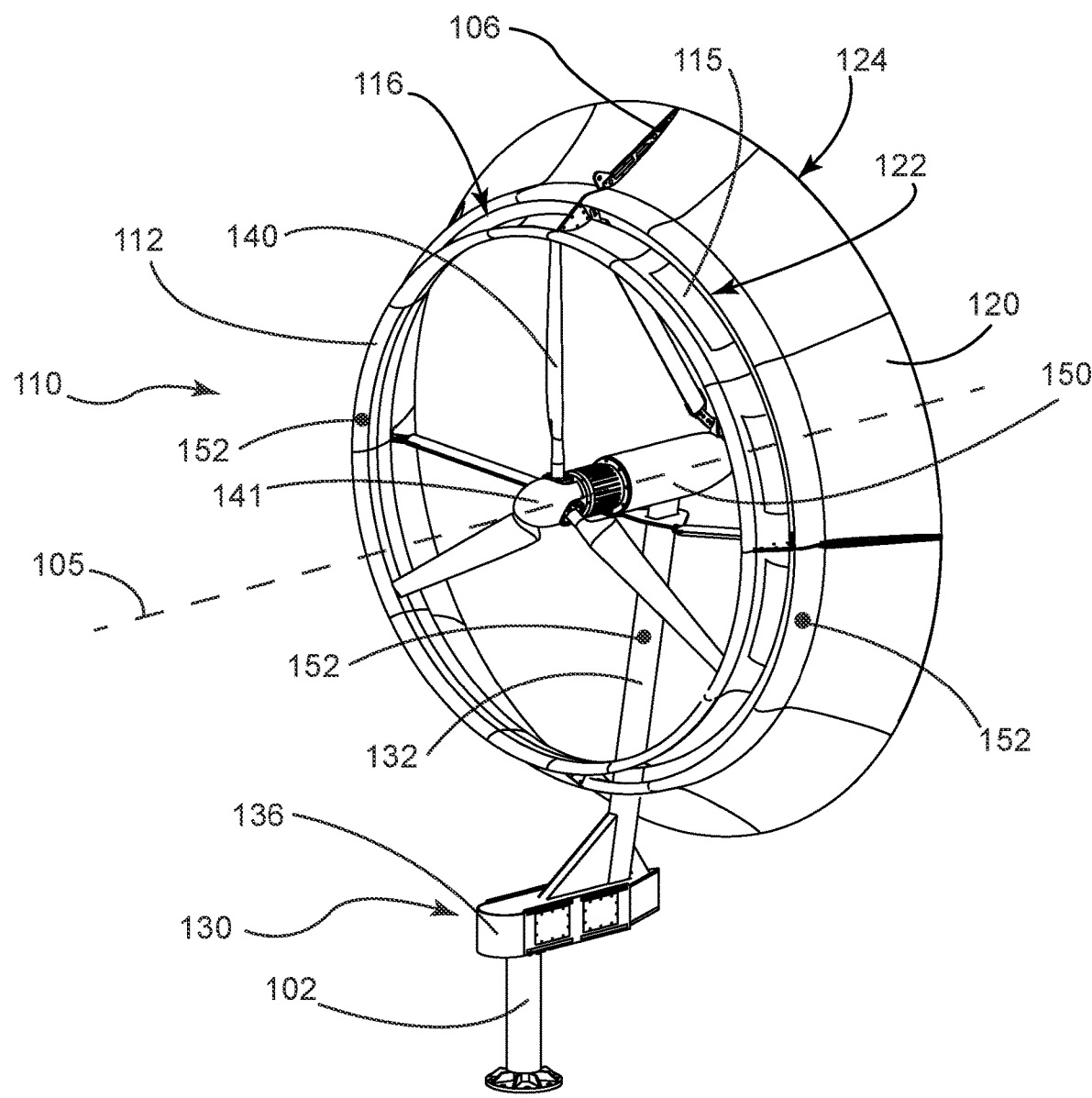
FIG. 3 is a right, perspective view of an iteration of the embodiment.

FIG. 1 and FIG. 3 show a shrouded fluid turbine 100 with a turbine shroud 110, a nacelle body 150, a rotor 140, and an ejector shroud 120.

The turbine shroud 110 includes a front, inlet end 112 (aka leading edge). The turbine shroud 110 also has a rear, exhaust, or "trailing" end 116. The trailing edge includes flaps 115.

The ejector shroud 120 has a front, inlet end ("leading edge") 122, and a rear, exhaust end or "trailing edge" 124. Support members 106 are shown connecting the turbine shroud 110 to the ejector shroud 120.

A rotor 140 surrounds the nacelle body 150 and has a central hub 141 at the proximal end of the rotor blades. The central hub 141 is rotationally engaged with the nacelle body 150. The rotor 140, turbine shroud 110, and ejector shroud 120 are coaxial (as shown by central axis 105). A support structure 130 has an upper vertical member 132 that is engaged at its distal end with the nacelle 150 and at its proximal end with a mostly horizontal section 134. The horizontal section 134 is engaged with a pivot point 136. The pivot point is in turn engaged with the upper section of the tower 102.

Figure 2:
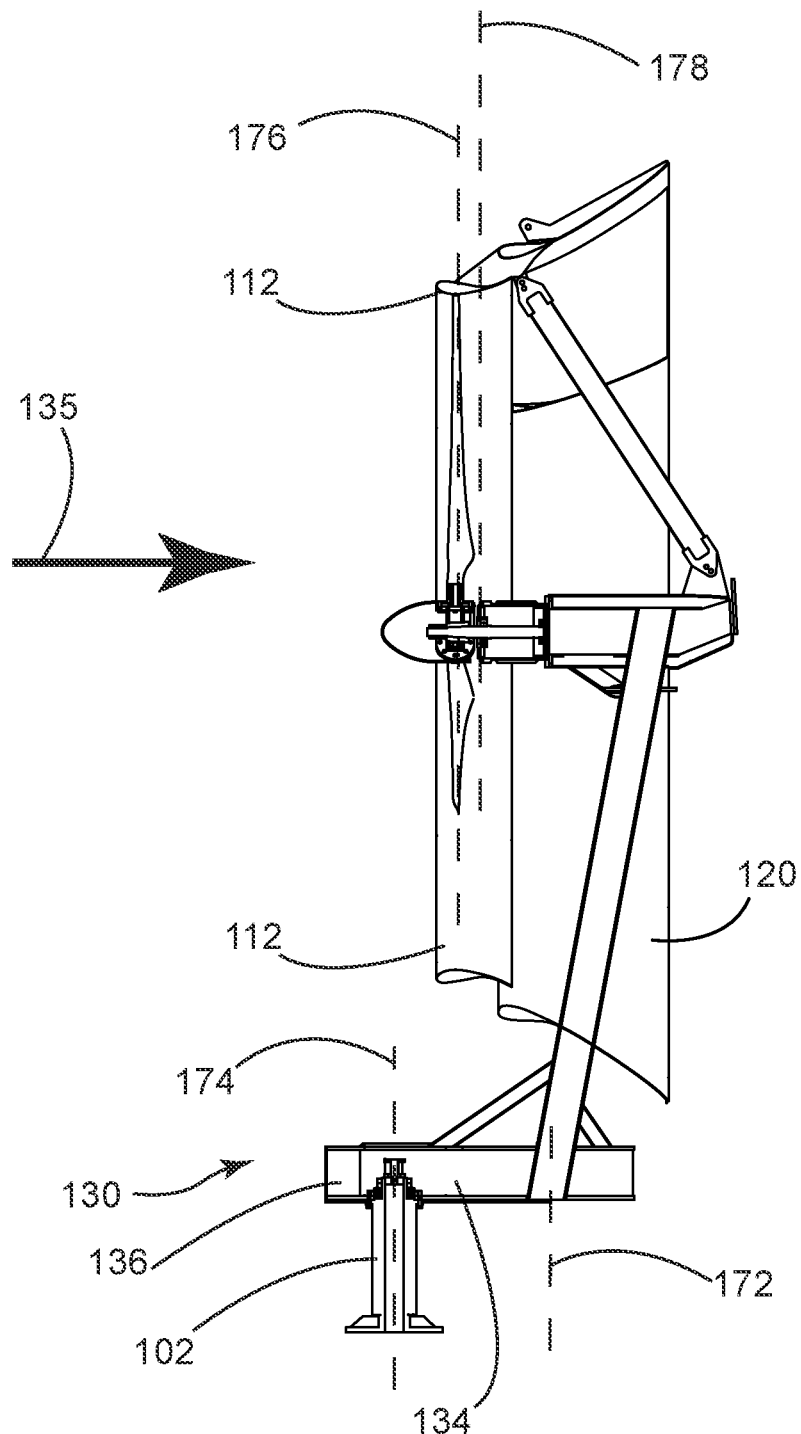
FIG. 2 is a side, section view of the fluid turbine of FIG. 1.

FIG. 2 illustrates a center of gravity 172, a pivot axis 174, a rotor plane 176, and a center of pressure 178, each approximated by dotted lines. The center of pressure 178, is downwind of the rotor plane 176. The pivot axis 174 at the center of the tower 102 is offset from the center of pressure 178. With center of pressure 178 offset from the pivot axis 174, a fluid stream, represented by arrow 135, exerts a force on the turbine, moving it downstream of the pivot axis 174 enabling passive yawing of the turbine such that it faces into the oncoming fluid stream. Having the pivot axis 174 offset from the center of pressure 178 provides a means of passively yawing the turbine, while maintaining the ejector shroud 120 downstream of the leading edge of the turbine shroud 112.

FIG. 3 shows a detail view of a segment of the turbine of FIG. 1. Sensors 152 are shown at various locations. These sensors measure static pressure and/or acoustic waves to determine the relationship between the fluid-stream axis direction and that of the turbine axis 105 from a location that is external to the yaw mechanism. The yaw mechanism, located at the tower pivot point 136, has a means of determining the rotation of the turbine about the vertical axis 174. An equal static-pressure reading from all sensors denotes that the fluid-stream direction and the turbine axis are aligned or on-axis. Unequal static pressure readings from the sensors denotes off-axis alignment, in which the fluid-stream direction and turbine are not aligned. A comparative-measurement means with a central processor (not shown) evaluates the two static pressure readings and produces results based on the level of equality or inequality of the two readings. Measuring comparative static pressure or acoustic signal provides an external means of measuring on-axis or off-axis orientation.

Figure 4:
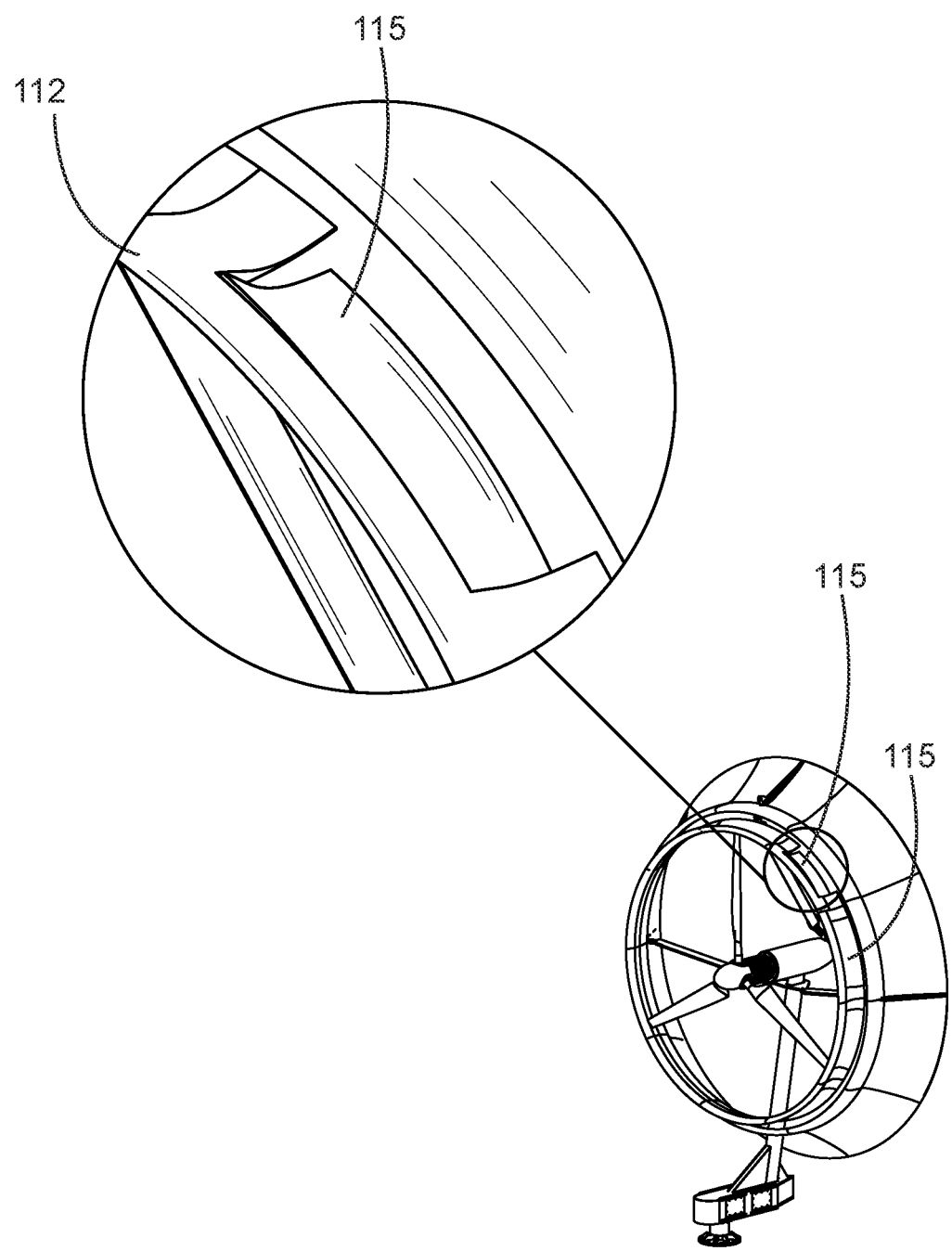
FIG. 4 is a front, right, perspective, exploded-detail view of the fluid turbine of FIG. 1

FIG. 4 is a detail view of the fluid turbine of FIG. 1. A flap 115 may pivot to turn inward toward the central axis 105 (FIG. 3). Flaps 115 are engaged with a pivoting mechanism that comprises a frame and suspension structure. A suspension system (not shown) provides support sufficient to keep the flap in an outward-turning position during normal operation. In excessive fluid-velocity conditions, the flaps 115 rotate downward toward the central axis 105 by the force of the fluid stream. Inward rotation of the flaps 115 increases drag while closing the aperture of the shroud and therefore reduces the rotational velocity of the rotor. Individual flaps 115 may be actuated to rotate inwards to increase drag on one side of the turbine, to yaw the turbine, or assist the turbine's mechanical-yaw system. The group of flaps 115 may be rotated inwards to increase drag, reduce fluid flow through the turbine, and reduce the force on the rotor 140 in excessive fluid-velocity events. Signals from the sensors 152 may be interpreted by a processor. Flaps 115 are controlled to equalize readings from all sensors 152 to yaw the turbine into the prevailing fluid stream. One skilled in the art is familiar with the use of flaps to control the direction of a body in a fluid stream.

Figure 5:
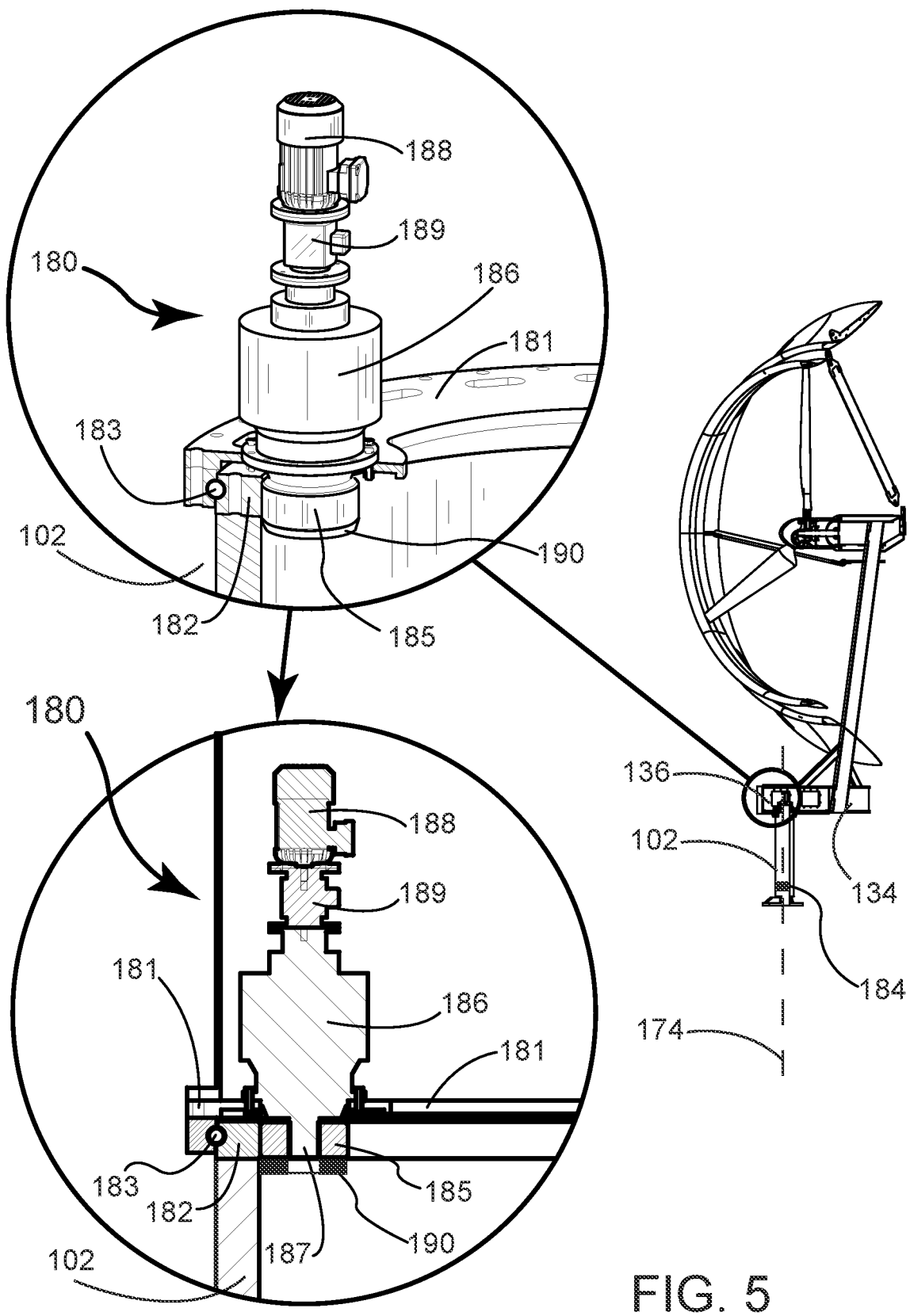
FIG. 5 is a right, perspective, detail and detail-section view of the fluid turbine of FIG. 1.
Figure 6:
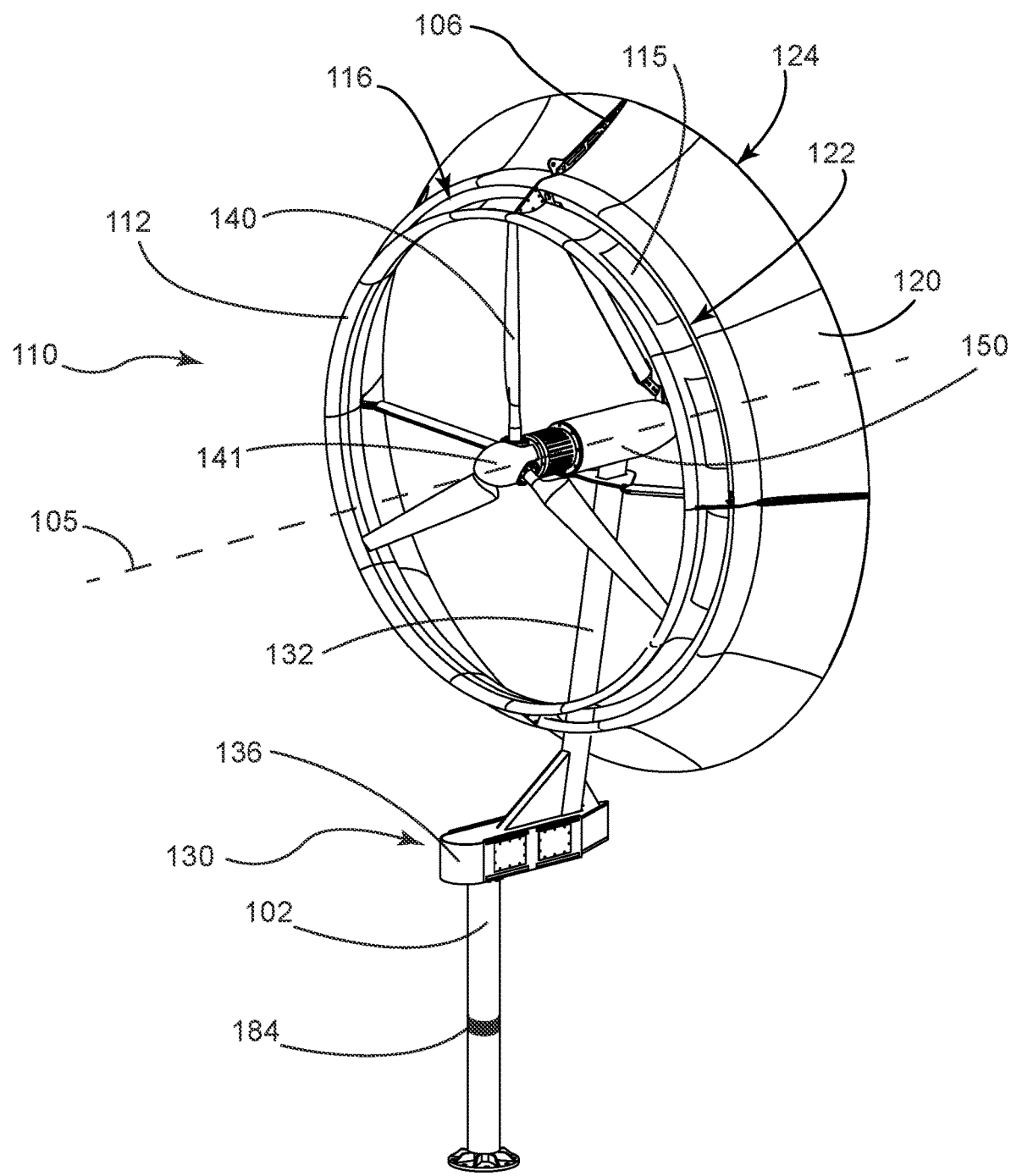
FIG. 6 is a right, perspective view of an iteration of the embodiment.

FIG. 5 shows an active yaw system. FIG. 6 is a right-perspective view if the fluid turbine of FIG. 1. An active-yaw system is comprised of motor-gear stacks 180. The motor-gear stacks 180 are engaged with the turbine pivoting structure 136 and are rotationally engaged with the tower 102. A motor 188 is engaged with a clutch 189 that is further engaged with a transmission 186. The transmission 186 comprises a set of reduction gears (not shown) that culminate at a drive shaft 187. The drive shaft is engaged with the pinion gear 185. The pinion gear 185 is engaged with a ring gear 182. The ring gear is affixed to the tower 102. The motor-gear stack is engaged with a top plate 181 that is further engaged with the turbine pivoting-structure 136, and pivots on the vertical axis 174. Strain sensors may be engaged with any of the rotational components of the active yaw system; examples are torque sensors engaged with the pinion gear 185. Off-axis fluid-stream flow causes the turbine horizontal support member 134 to rotate, the resulting torque on the pivot-point 136 causes torque on the pinion gear 185. Torque sensors in the active-yaw system measure the force and direction of the torque on the system. Strain gauges are located at an area 184 of the tower 102 where moment-arm thrust-forces are significant. An increase in fluid velocity results in a predictable increase in moment-arm forces on the tower 102.

FIG. 6 shows a shrouded fluid turbine 100 comprising a turbine shroud 110, a nacelle body 150, a rotor 140, and an ejector shroud 120. The turbine shroud 110 includes a front end 112, also known as an inlet end or a leading edge. The turbine shroud 110 has a rear end 116, also known as an exhaust end or trailing edge. The ejector shroud 120 includes a front end, also known as an inlet end or leading edge 122, and a rear end/exhaust end/trailing edge 124. Support members 106 connect the turbine shroud 110 to the ejector shroud 120.

The rotor 140 surrounds the nacelle body 150 and comprises a central hub 141 at the proximal end of the rotor blades. The central hub 141 is rotationally engaged with the nacelle body 150. The rotor 140, turbine shroud 110, and ejector shroud 120 are coaxial (central axis 105). A support structure 130 is comprised of an upper vertical member 132 that is engaged at the distal end with the nacelle 150 and at the proximal end with a mostly horizontal section 134, which is further engaged with a pivot point 136. The pivot point is in turn engaged with the upper section of the tower 102. A strain gauge 184 is integrated into the tower 102 where moment-arm thrust-forces are significant. An increase in fluid velocity results in a predictable increase in moment-arm forces on the tower 102, particularly in an area 184.

Figure 7:
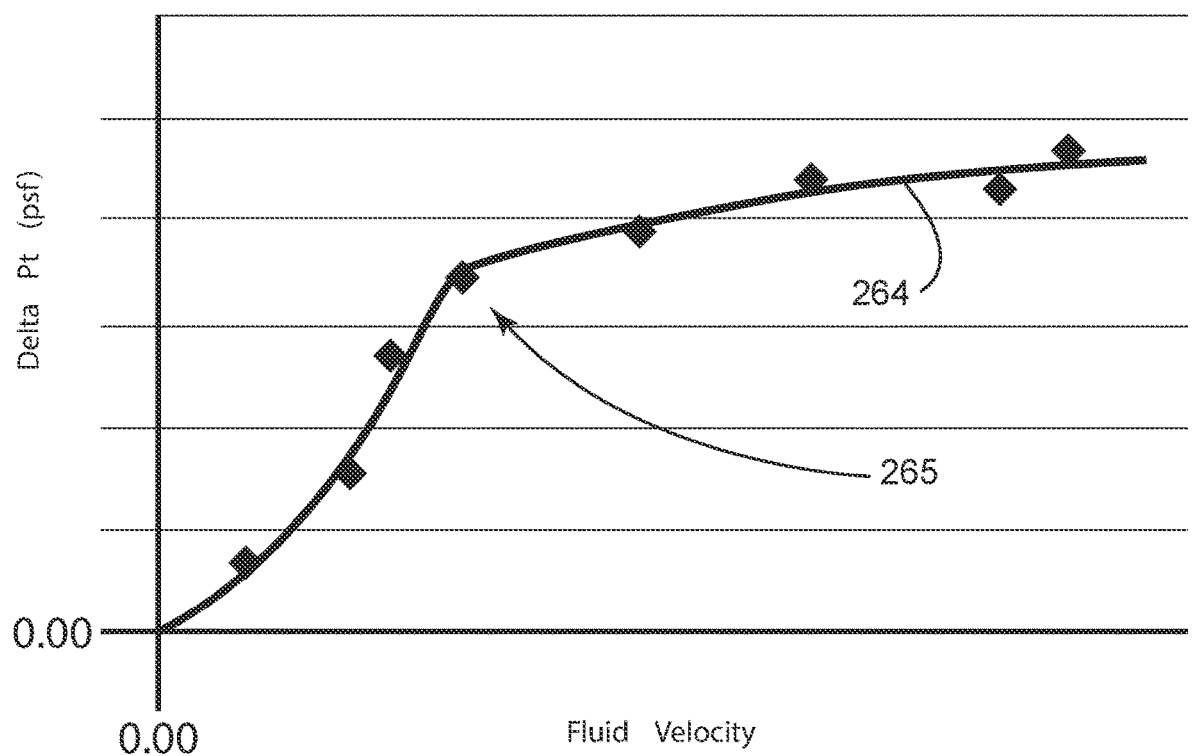
FIG. 7 is a graph illustrating standard deviations in yaw-system torque.
Figure 8:
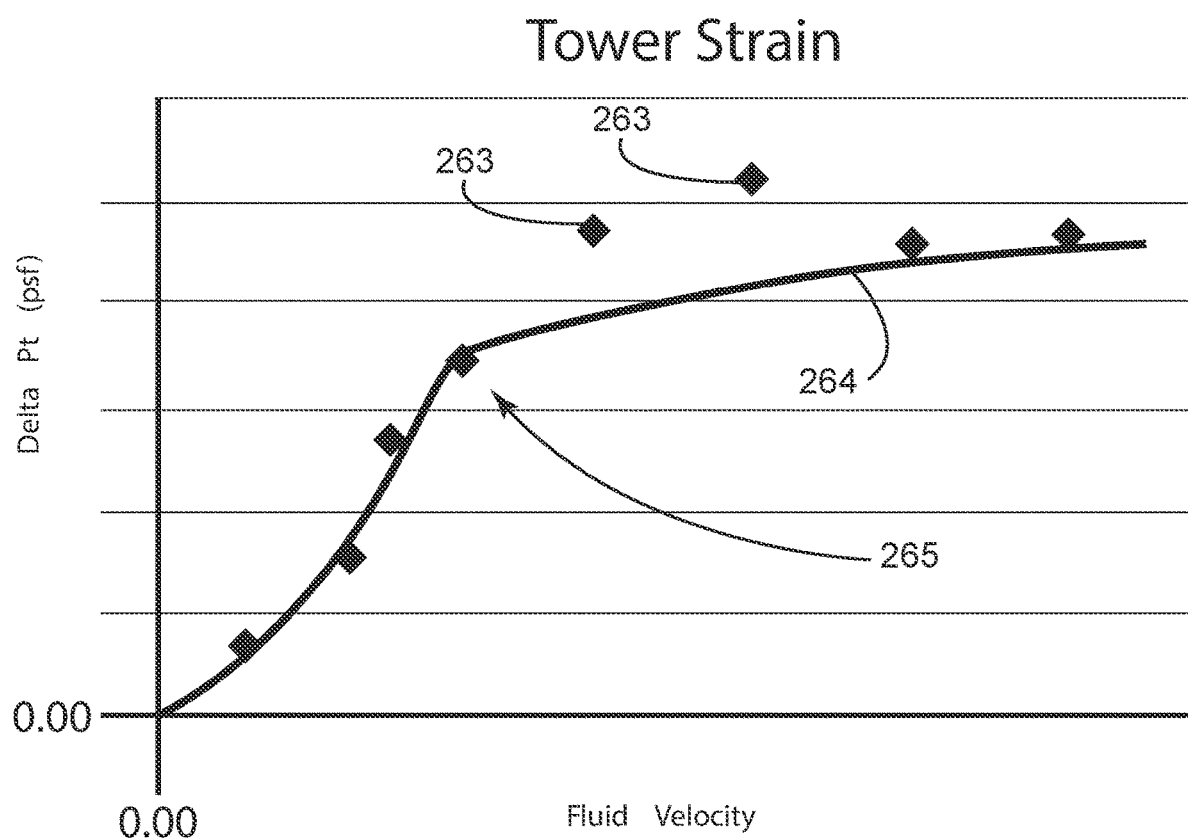
FIG. 8 is a graph illustrating significant deviations in yaw-system torque.

FIG. 7 and FIG. 8 are graphs that illustrate data points along a predictive curve 264 related to tower strain measured by strain gauges 184 (FIG. 6). As the turbine 100 experiences increased fluid velocity, strain on the tower increases, shown by a Delta Pt, otherwise known as an increase in pounds per square foot (psf). This is measured by the strain gauge 184, which gives data points. Under normal operating conditions, standard deviation of data points about a predictive curve 264 are likely to occur. Strain on the tower increases with the increase in fluid velocity, until the flaps 115 (FIG. 6), begin to rotate downward, occurring at data point 265 where there is a change in the direction of the predictive curve 264. Rotation of the flaps 115 (FIG. 4) reduces drag on the shroud and hence strain on the tower, resulting in a shallower curve thereafter. FIG. 8 illustrates data points along the predictive curve 264 and similarly, data point 265 denoting the change in strain related to rotation of flaps 115 (FIG. 4). Data points 263 lie outside the standard deviation and likely occur when at least one flap fails to rotate, denoting a malfunction in the flap pivot system as described in FIG. 4.

Figure 9:
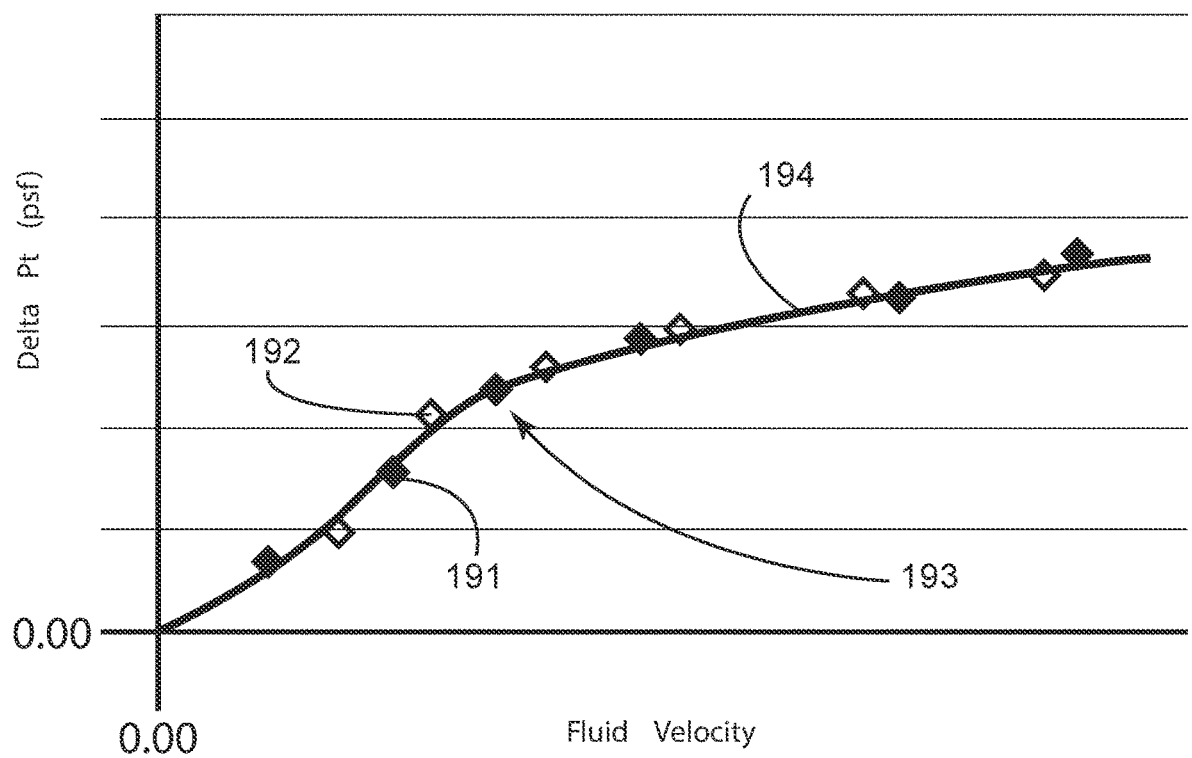
FIG. 9 is a graph illustrating standard deviations in tower strain.
Figure 10:
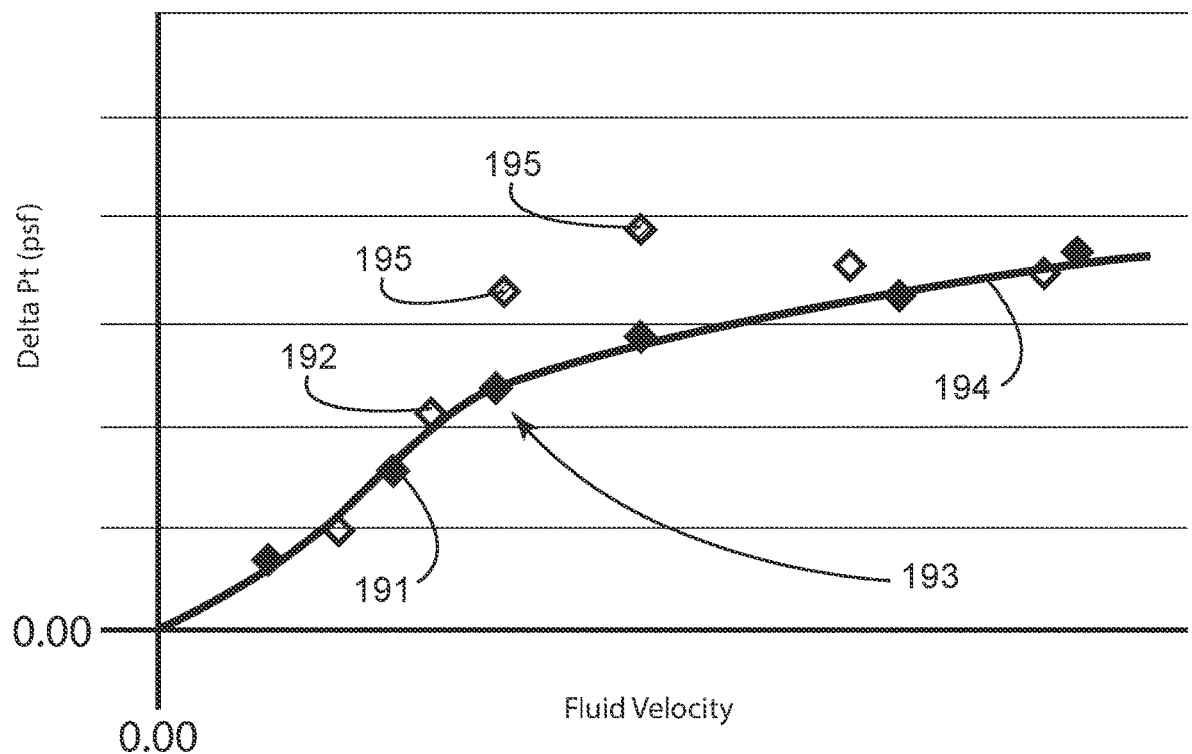
FIG. 10 is a graph illustrating significant deviations in tower strain.

The graphs in FIG. 9 and FIG. 10 illustrate data points 191, 192 along a predictive curve 194 related to yaw system torque. As the turbine 100 experiences off-axis gusts, torque sensors in the active yaw system 190 will provide clockwise data points 191 and counter-clockwise data points 192. Under normal operating conditions, standard deviation of data points about a predictive curve 190 are likely to occur. Similar to the manner in which the predictive curve changes abruptly (resulting from the rotation of the flaps 115), the predictive curve 194 is shallower after data point 193 as the drag on the shrouds is reduced. FIG. 10 illustrates data points 191, predictive curve 194 and similarly, data point 193, which denotes the change in yaw torque related to rotation of flaps 115 (FIG. 4). Data points 195 lie outside the standard deviation and likely occur when at least one mixing element fails to rotate, denoting a malfunction in the mixing-element pivot system as described in FIG. 4.

The relation between the anomalies in the strain-gauge data points and the yaw-mechanism data points, in combination, can be used to locate specifically which flap has failed. Combining pitot probe/acoustic data with tower-strain gauge data and yaw-torque data provides a means of determining proper performance of the actuated flaps 115; or, in the event of a malfunction, which flap has malfunctioned.

The invention claimed is:

1. A fluid turbine comprising:
   a rotor mechanically coupled with a generator; and
   a duct in fluid communication with said rotor and surrounding said rotor; and
   at least two sensors spaced about said duct, configured to measure static pressure; and
   a processor to interpret signals from said at least two sensors; and
   at least two flaps engaged with said duct and contiguous with a surface of said duct, mechanically coupled with motion activation equipment configured to rotate said at least two flaps contiguous with said duct surface and away from said duct surface; and
   said motion activation equipment electronically coupled with said processor;
   wherein rotation of at least one of said at least two flaps alters a yaw direction of said fluid turbine to equalize measurement signals from said at least two sensors, and said signals may be interpreted to determine alignment of said fluid turbine with a fluid stream.

2. The fluid turbine of claim 1 further comprising:
   a rotor plane defined by said rotor swept area; and
   a horizontal axis extending from a center of said rotor plane, perpendicular to said rotor plane; and
   a central axis perpendicular to said horizontal axis and extending from said center of said rotor plane; and
   a center of pressure downwind of said central axis; and
   a yaw axis parallel to, and upwind of, said central axis; and
   a vertical support structure concentric with said yaw axis; and
   at least one strain gauge engaged with said vertical support structure; and
   said at least one strain gauge electronically coupled to said processor; wherein signals from said at least one strain gauge are interpreted by said processor wherein said flaps are actuated to reduce fluid flow through said duct in high velocity fluid events.

* * * * *